United States Patent
Zhuang et al.

(10) Patent No.: US 7,593,514 B1
(45) Date of Patent: Sep. 22, 2009

(54) METHODS AND APPARATUSES FOR COMMUNICATING BETWEEN MESSAGING AND TELEPHONY SYSTEMS

(75) Inventors: Jieyao Zhuang, Zhejiang (CN); Clement Chiang, Fremont, CA (US); Lei Zhu, San Jose, CA (US)

(73) Assignee: WebEx Communications, Inc., Santa Clara, CA (US)

( * ) Notice: Subject to any disclaimer, the term of this patent is extended or adjusted under 35 U.S.C. 154(b) by 647 days.

(21) Appl. No.: 11/171,848

(22) Filed: Jun. 29, 2005

Related U.S. Application Data

(60) Provisional application No. 60/651,488, filed on Dec. 28, 2004.

(51) Int. Cl.
*H04M 11/06* (2006.01)
(52) U.S. Cl. ............. 379/93.23; 370/352; 379/88.17; 379/114.01; 379/202.01; 455/418; 704/270
(58) Field of Classification Search .......... 379/88.17, 379/90.01, 114.01, 93.23, 202.01; 370/260, 370/352; 709/230; 455/418; 704/270
See application file for complete search history.

(56) References Cited

U.S. PATENT DOCUMENTS

| | | | |
|---|---|---|---|
| 6,574,471 B1 * | 6/2003 | Rydbeck | 455/418 |
| 7,031,268 B1 * | 4/2006 | Shaffer et al. | 370/260 |
| 7,222,075 B2 * | 5/2007 | Petrushin | 704/270 |
| 7,248,677 B2 * | 7/2007 | Randall et al. | 379/93.23 |
| 7,274,778 B2 * | 9/2007 | Hanson et al. | 379/90.01 |
| 7,382,868 B2 * | 6/2008 | Moore et al. | 379/114.01 |
| 2002/0071539 A1 * | 6/2002 | Diament et al. | 379/202.01 |
| 2004/0062230 A1 * | 4/2004 | Taylor et al. | 370/352 |
| 2005/0114533 A1 * | 5/2005 | Hullfish et al. | 709/230 |
| 2006/0147021 A1 * | 7/2006 | Batni et al. | 379/221.08 |

* cited by examiner

*Primary Examiner*—Gerald Gauthier
(74) *Attorney, Agent, or Firm*—Cesari and McKenna, LLP

(57) ABSTRACT

In one embodiment, the methods and apparatuses receive a telephone number from an originating device; match the telephone number to an IM identifier; associate the IM identifier to a receiving device; and establish a telephone call between the originating device and the receiving device.

21 Claims, 6 Drawing Sheets

400

1. Participant ID 410

2. Phone Number 420

3. Type of Service 430

4. Additional Information 440

METHODS AND APPARATUSES FOR COMMUNICATING BETWEEN MESSAGING AND TELEPHONY SYSTEMS

RELATED APPLICATION

The present invention is related to, and claims the benefit of U.S. patent application Ser. No. 11/025,863, reassigned U.S. Provisional Patent Application No. 60/651,488, filed on Dec. 28, 2004, entitled, "System And Method For Two-Way Interoperability Between Instant Messaging And Telephony Systems," by Lei Zhu and Jieyao Zhuang.

FIELD OF INVENTION

The present invention relates generally to telecommunications systems and, more particularly, to communicating between messaging and telephony systems.

BACKGROUND

Conventional telecommunications systems such as the Public Switched Telephone Network (PSTN) are utilized by many people worldwide to carry voice and data from one location to another location. There are also other systems that are utilized to transmit voice and data between multiple locations such as voice over IP (VoIP), cellular telephones, electronic mail, and instant messaging.

SUMMARY

In one embodiment, the methods and apparatuses receive a telephone number from an originating device; match the telephone number to an IM identifier; associate the IM identifier to a receiving device; and establish a telephone call between the originating device and the receiving device.

BRIEF DESCRIPTION OF THE DRAWINGS

The accompanying drawings, which are incorporated in and constitute a part of this specification, illustrate and explain one embodiment of the methods and apparatuses for communicating between messaging and telephony systems.

In the drawings.

DETAILED DESCRIPTION

The following detailed description of the methods and apparatuses for communicating between messaging and telephony systems refers to the accompanying drawings. The detailed description is not intended to limit the methods and apparatuses for communicating between messaging and telephony systems. Instead, the scope of the methods and apparatuses for communicating between messaging and telephony systems is defined by the appended claims and equivalents. Those skilled in the art will recognize that many other implementations are possible, consistent with the present invention.

References to a client include a device utilized by a user such as a desktop computer, a portable computer, a personal digital assistant, a video phone, a landline telephone, a cellular telephone, and a device capable of receiving/transmitting an electronic signal.

References to an instant messaging (IM) identifier refer to an electronic profile associated with a particular user.

References to a recipient user refer to a user that receives a telephone call.

References to a recipient device refer to a client device that is associated with a recipient user.

References to an originating user refer to a user that initiates a telephone call to the recipient user.

References to a participant refer to either a recipient user or a originating user that takes part in a telephone call.

In one embodiment, the methods and apparatuses for communicating between messaging and telephony systems allow a recipient user utilizing an IM identifier to receive a telephone call initiated from a traditional telephone device through a PSTN network. Further, the recipient user is associated with the recipient device through the IM identifier.

In another embodiment, the methods and apparatuses for communicating between messaging and telephony systems allow a recipient user utilizing an IM identifier to receive a telephone call initiated from a VoIP telephone device through a softswitch network.

Figure 1:
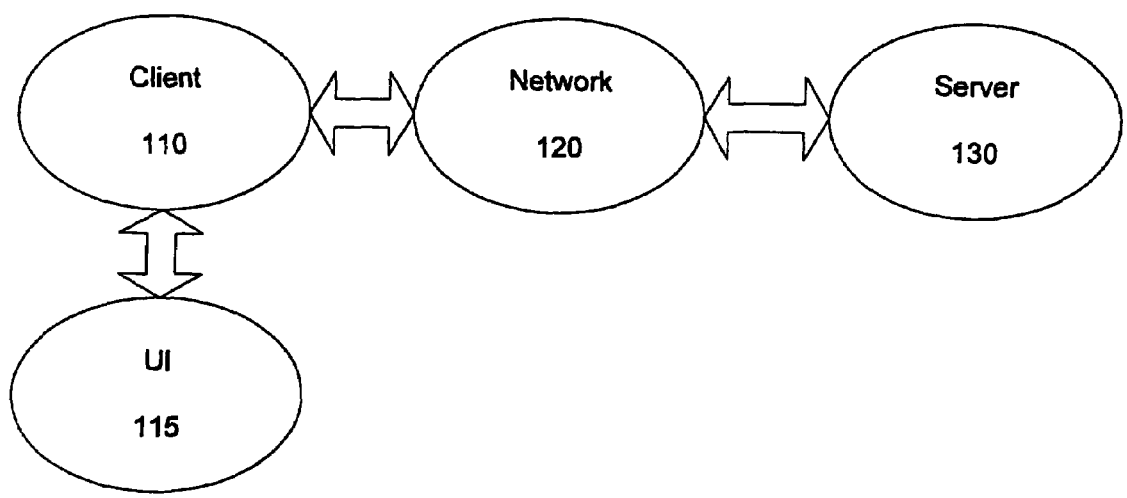
FIG. 1 is a diagram illustrating an environment within which the methods and apparatuses for communicating between messaging and telephony systems are implemented.

FIG. 1 is a diagram illustrating an environment within which the methods and apparatuses for communicating between messaging and telephony systems are implemented. The environment includes an electronic device 110 (e.g., a computing platform configured to act as a client device, such as a computer, a personal digital assistant, and the like), a user interface 115, a network 120 (e.g., a local area network, a home network, the Internet), and a server 130 (e.g., a computing platform configured to act as a server).

In one embodiment, one or more user interface 115 components are made integral with the electronic device 110 (e.g., keypad and video display screen input and output interfaces in the same housing such as a personal digital assistant. In other embodiments, one or more user interface 115 components (e.g., a keyboard, a pointing device such as a mouse, a trackball, etc.), a microphone, a speaker, a display, a camera are physically separate from, and are conventionally coupled to, electronic device 110. In one embodiment, the user utilizes interface 115 to access and control content and applications stored in electronic device 110, server 130, or a remote storage device (not shown) coupled via network 120.

In accordance with the invention, embodiments of communicating between messaging and telephony systems below are executed by an electronic processor in electronic device 110, in server 130, or by processors in electronic device 110 and in server 130 acting together. Server 130 is illustrated in FIG. 1 as being a single computing platform, but in other instances are two or more interconnected computing platforms that act as a server.

Figure 2:
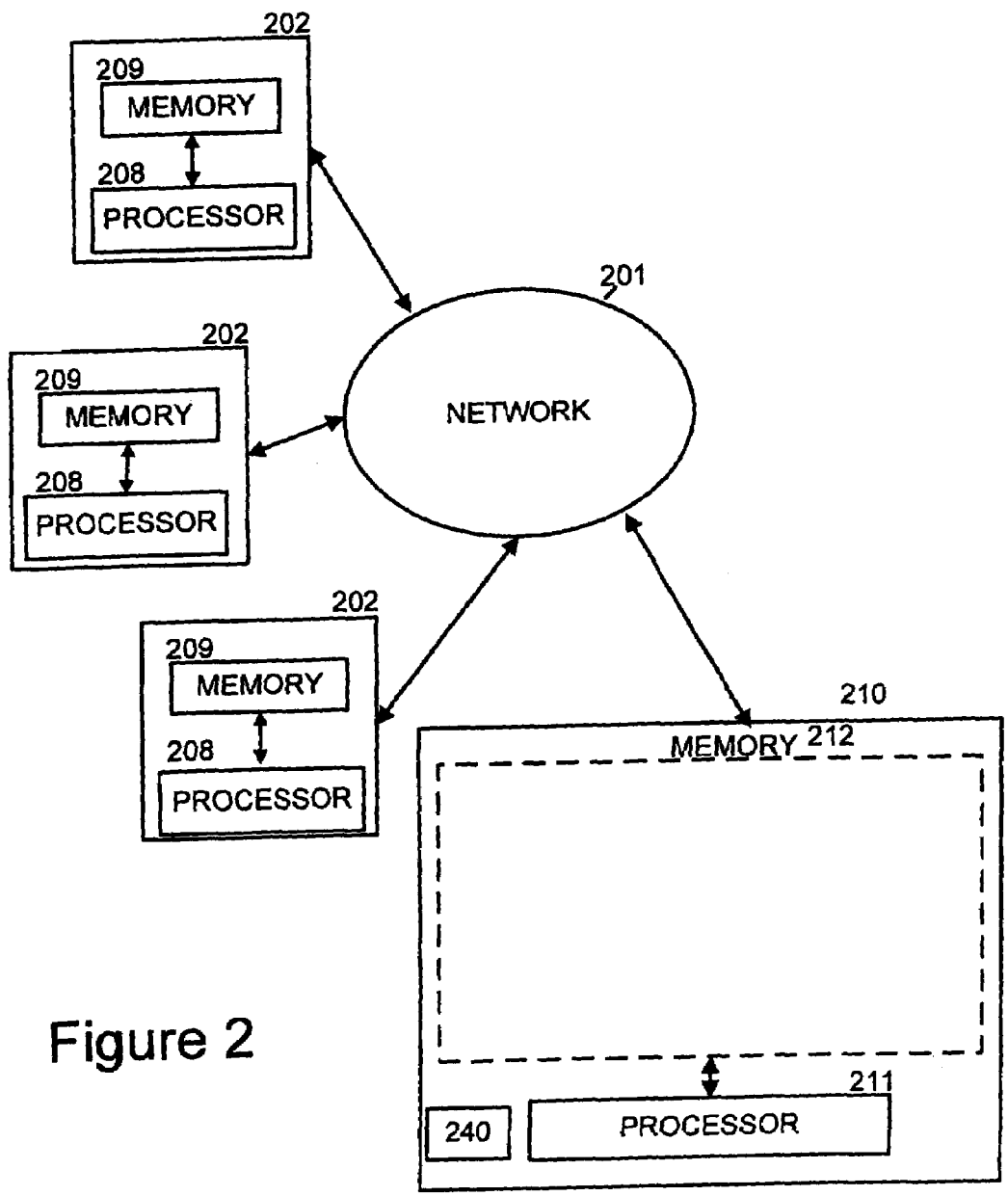
FIG. 2 is a simplified block diagram illustrating one embodiment in which the methods and apparatuses communicating between messaging and telephony systems are implemented.

FIG. 2 is a simplified diagram illustrating an exemplary architecture in which the methods and apparatuses for communicating between messaging and telephony systems are implemented. The exemplary architecture includes a plurality of electronic devices 202, a server device 210, and a network 201 connecting electronic devices 202 to server 210 and each electronic device 202 to each other. The plurality of electronic devices 202 are each configured to include a computer-readable medium 209, such as random access memory, coupled to an electronic processor 208. Processor 208 executes program instructions stored in the computer-readable medium 209. In one embodiment, a unique user operates each electronic device 202 via an interface 115 as described with reference to FIG. 1.

The server device 130 includes a processor 211 coupled to a computer-readable medium 212. In one embodiment, the server device 130 is coupled to one or more additional external or internal devices, such as, without limitation, a secondary data storage element, such as database 240.

In one instance, processors 208 and 211 are manufactured by Intel Corporation, of Santa Clara, Calif. In other instances, other microprocessors are used.

In one embodiment, the plurality of client devices 202 and the server 210 include instructions for a customized application for communicating between messaging and telephony systems. In one embodiment, the plurality of computer-readable media 209 and 212 contain, in part, the customized application. Additionally, the plurality of client devices 202 and the server 210 are configured to receive and transmit electronic messages for use with the customized application. Similarly, the network 210 is configured to transmit electronic messages for use with the customized application.

One or more user applications are stored in media 209, in media 212, or a single user application is stored in part in one media 209 and in part in media 212. In one instance, a stored user application, regardless of storage location, is made customizable based on communicating between messaging and telephony systems as determined using embodiments described below.

Figure 3:
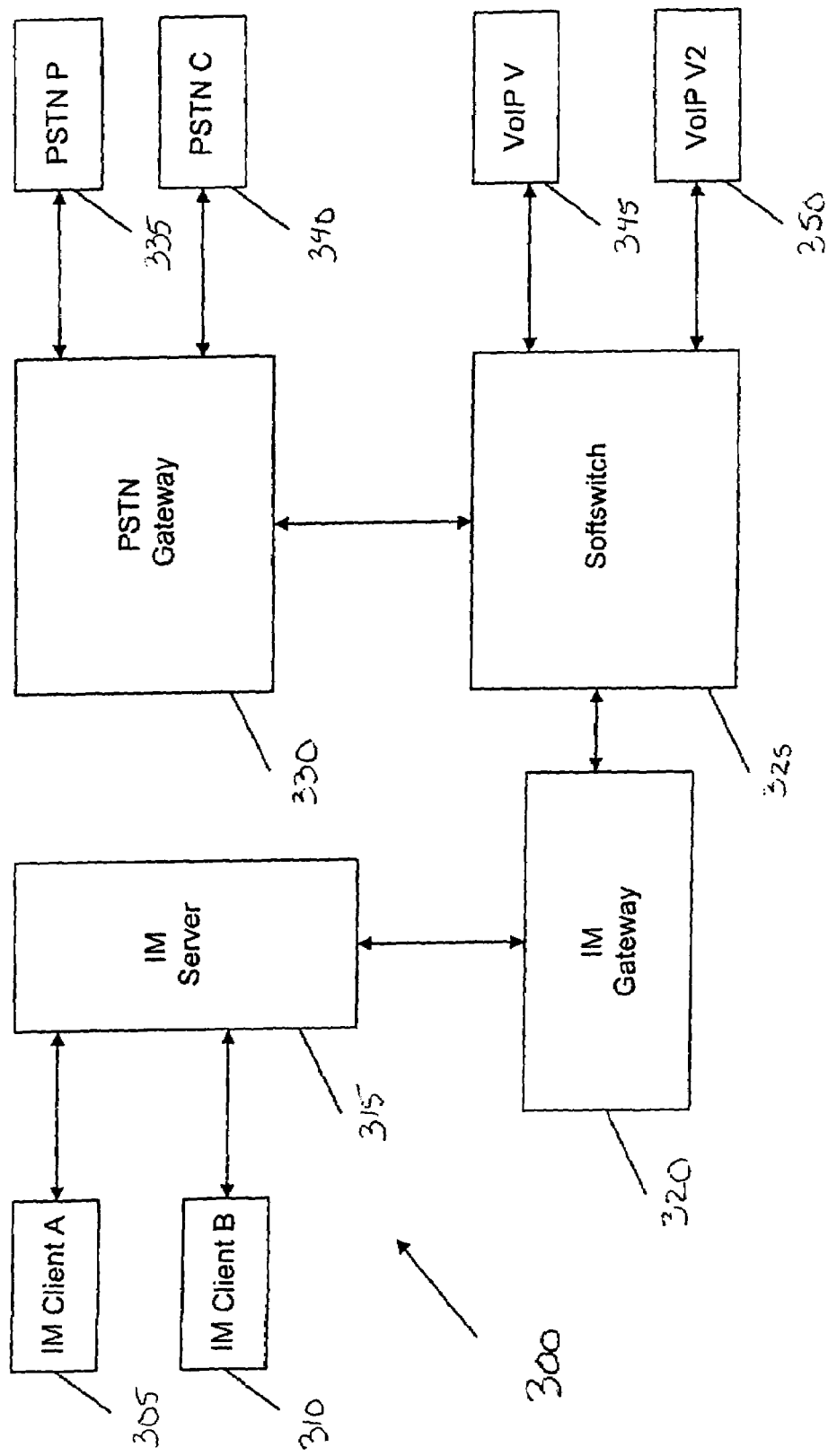
FIG. 3 is a simplified block diagram illustrating a system, consistent with one embodiment of the methods and apparatuses for communicating between messaging and telephony systems.

FIG. 3 illustrates one embodiment of a system 300. In one embodiment, the system 300 is embodied within the server 130. In another embodiment, the system 300 is embodied within the electronic device 110. In yet another embodiment, the system 300 is embodied within both the electronic device 110 and the server 130.

In one embodiment, the system 300 includes an IM client 305, IM client 310, IM server 315, IM gateway 320, softswitch 325, PSTN gateway 330, PSTN client 335, PSTN client 340, VoIP client 345, and VoIP client 350.

In one embodiment, the IM clients 305 and 310 are each coupled to the IM server 315. In one embodiment, the IM clients 305 and 310 are configured to support visual messaging and audio messaging with each other. In another embodiment, the IM clients 305 and 310 are configured to support visual messaging and audio messaging with VoIP clients 345 and 350. In yet another embodiment, the IM clients 305 and 310 are configured to support visual messaging and audio messaging with PSTN clients 335 and 340.

In one embodiment, the visual messaging includes exchanging text messages, graphical messages, and the like between two or more clients. In one embodiment, audio messaging includes exchanging voice communications between two or more clients. In one embodiment, visual messaging and audio messaging occurs in real time.

In one embodiment, the IM clients 305 and 310 are each assigned a unique identifier such as an IM identifier. Further, the IM clients 305 and 310 are also each assigned a telephone number that is associated with each IM client.

In one embodiment, each of the IM clients 305 and 310 area associated with a particular user. For example, the IM client 305 may be initially associated with a first user. While associated with the first user, the IM client 305 is assigned a first telephone number that is associated with the first user. Subsequently, the IM client 305 is associated with a second user. While associated with the first user, the IM client 305 is assigned a second telephone number that is associated with the second user.

In one embodiment, a unique telephone number is associated with each IM client. In another embodiment, a main telephone number is associated with multiple IM clients wherein each IM client is associated with a unique extension number. In yet another embodiment, a telephone number is associated with multiple IM clients wherein an individual IM client is selected based on the call originators identity or the call originator's location.

In one embodiment, the IM server 315 is utilized to allow the IM clients 305 and 310 to communicate with other devices. In one embodiment, the IM server 315 manages resources for the IM clients 305 and 310. In one embodiment, the IM server 315 is coupled to the IM gateway 320.

In one embodiment, the IM gateway provides a protocol conversion between the IM server 315 and the softswitch 325. In one embodiment, the IM gateway 320 is coupled to the softswitch 325.

In one embodiment, the IM gateway 320 is configured to store and recognize the telephone numbers associated with the IM clients 305 and 310.

In one embodiment, the softswitch 325 is configured to route calls from the PSTN clients 335 and 340 and the VoIP clients 345 and 350 to the IM gateway 320. In one embodiment, the softswitch 325 and the IM gateway 320 communicate utilizing standardized protocols such as SIP. In one embodiment, the softswitch 325 is coupled to the VoIP clients 345 and 350. In addition, the softswitch 325 is also coupled to the PSTN gateway 330.

In one embodiment, the PSTN gateway 330 is coupled to the PSTN clients 335 and 340. In one embodiment, the PSTN gateway 330 provides protocol conversion between the softswitch 325 and the PSTN protocol.

The system 300 in FIG. 3 is shown for exemplary purposes and is merely one embodiment of the methods and apparatuses for communicating between messaging and telephony systems. Additional elements may be added to the system 300 without departing from the scope of the methods and apparatuses for communicating between messaging and telephony systems. Similarly, elements may be combined or deleted without departing from the scope of the methods and apparatuses for communicating between messaging and telephony systems.

Figure 4:
FIG. 4 is an exemplary record for use with the methods and apparatuses for communicating between messaging and telephony systems.

FIG. 4 illustrates an exemplary record 400 for use with the methods and apparatuses for communicating between messaging and telephony systems. In one embodiment, the record 400 illustrates an exemplary record associated with the initiation and participation of client devices during an interactive session.

In one embodiment, there are multiple records such that each record 400 is associated with a particular user of a client. Further, each user may correspond with multiple records wherein each record 400 is associated with a particular profile associated with the user.

In one embodiment, the record 400 includes a participant identification field 410, a phone number field 420, a service type field 430, and an additional information field 440. In one embodiment, the record 400 resides within the IM server 315. In another embodiment, the record 400 resides within the IM gateway 320.

In one embodiment, the participant identification field 410 includes information related to the identity of the participant associated with the particular client during the communication session. In one embodiment, the participant identification field 410 comprises an IM identifier associated with the participant.

In one embodiment, the phone number field 420 includes a phone number associated with the participant listed within the participant identification field 410. In one embodiment, the phone number listed within the phone number field 420 is a ten digit number with the leading three digits being an area code such that the telephone number conforms to the PSTN convention. In another embodiment, the telephone number can be represented by any string of characters or digits.

In one embodiment, the service type field 430 describes the type of service that the particular participant has selected. Exemplary services include: a conventional individual phone number, a shared phone number based on a unique extension, a shared phone number based on the a geographic area, and the like. Details for the exemplary services are described below.

In one embodiment, the additional information field 440 allows additional information to be stored that is associated with the participant identified within the participant identification field 410. For example, an extension number associated with the participant may be stored such that the participant is identified in conjunction with the shared phone number. Further, a geographic region associated with the participant may be stored such that the participant is identified in conjunction with the shared phone number in another embodiment.

Figure 5:
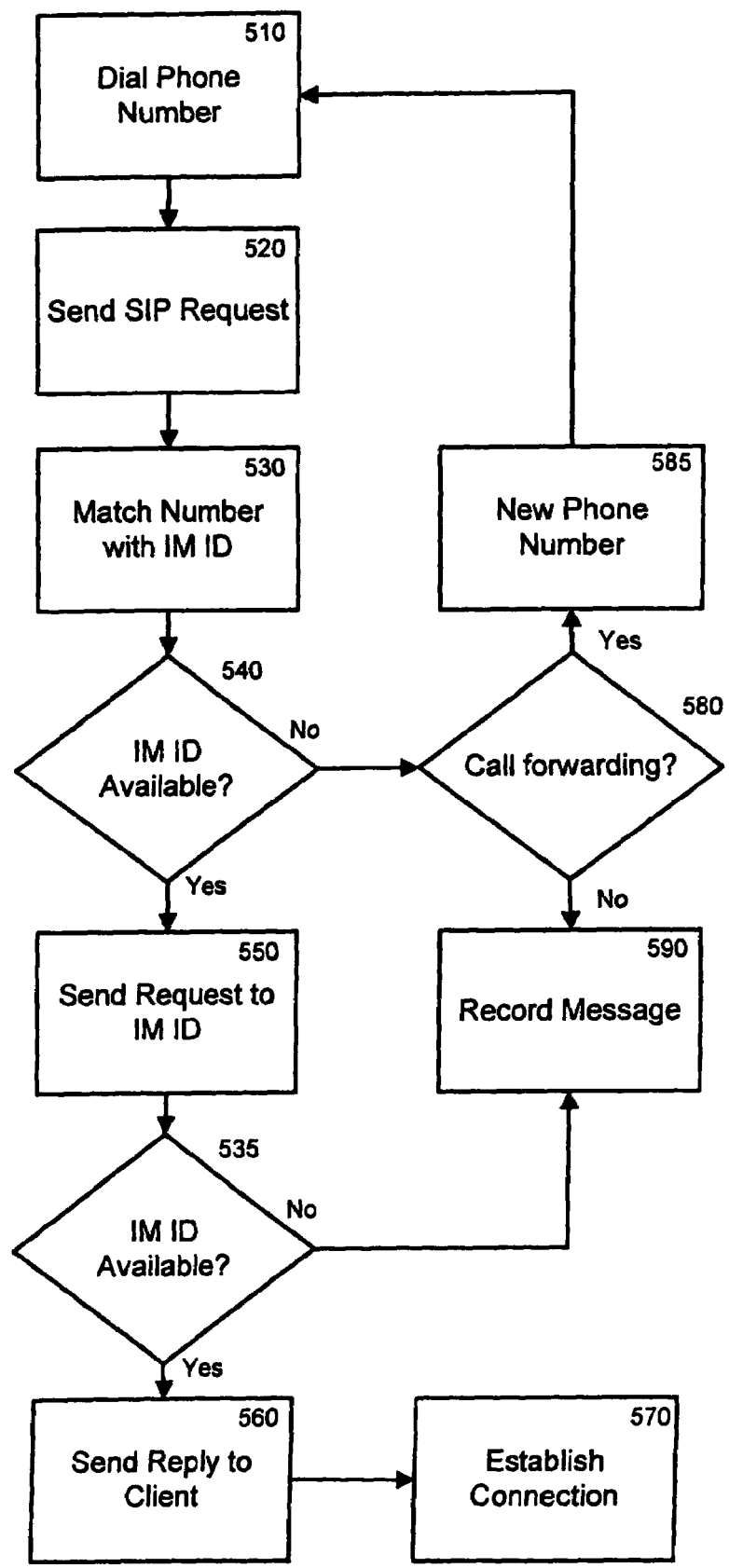
FIG. 5 is a flow diagram consistent with one embodiment of the methods and apparatuses for communicating between messaging and telephony systems.
Figure 6:
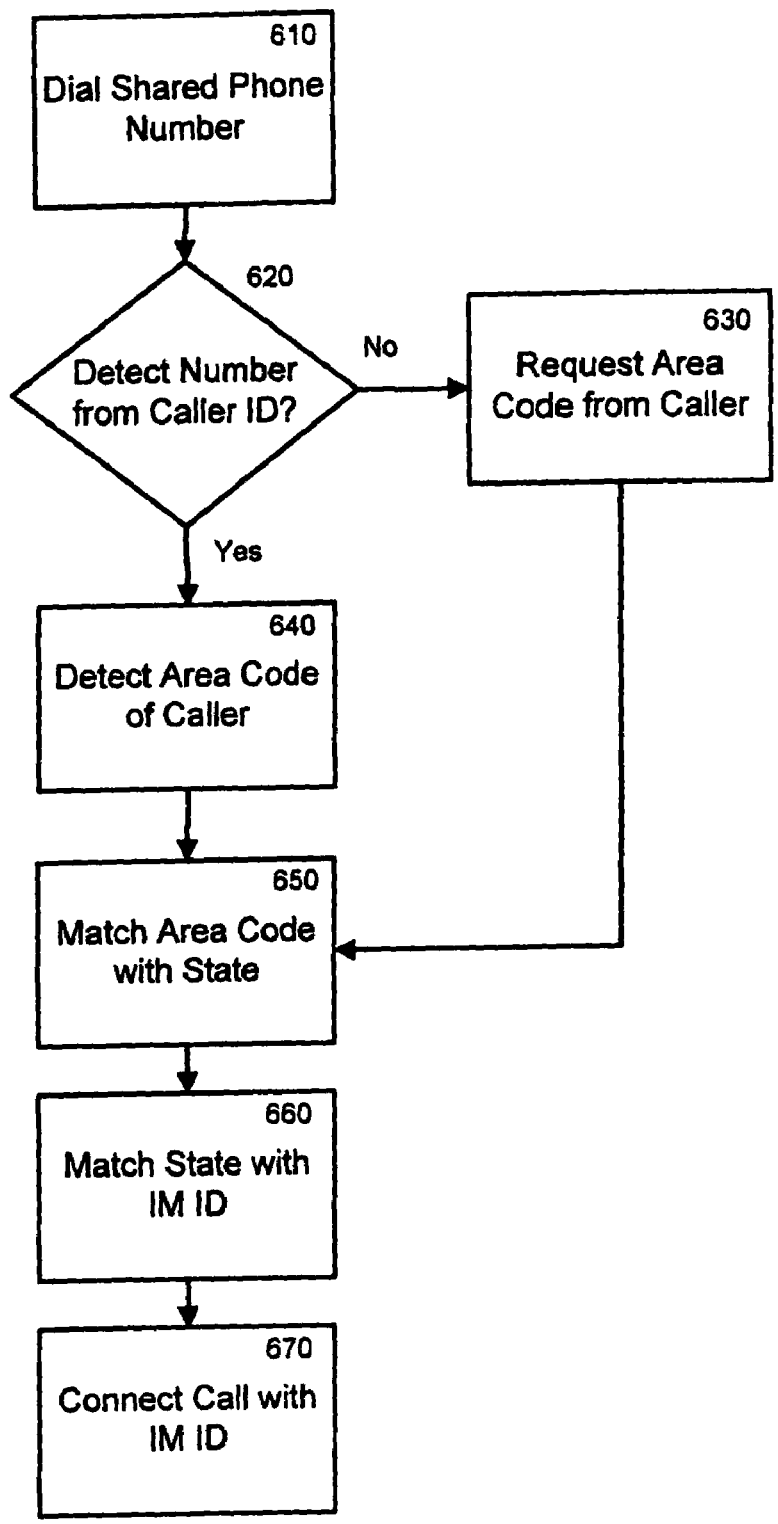
FIG. 6 is a flow diagram consistent with one embodiment of the methods and apparatuses for communicating between messaging and telephony systems.

The flow diagrams as depicted in FIGS. 5 and 6 are one embodiment of the methods and apparatuses for communicating between messaging and telephony systems. The blocks within the flow diagrams can be performed in a different sequence without departing from the spirit of the methods and apparatuses for communicating between messaging and telephony systems. Further, blocks can be deleted, added, or combined without departing from the spirit of the methods and apparatuses for communicating between messaging and telephony systems.

The flow diagram in FIG. 5 illustrates initiating a call originating from a client capable of dialing a phone number through a PSTN standard wherein the call is to be received by an IM client according to one embodiment of the invention.

In Block 510, a phone number is dialed. In one embodiment, the phone number is configured in a standardized format according to the PSTN convention.

In one embodiment, the device dials the telephone number for the purpose of initiating a telephone call to the recipient device associated with the recipient user. In one embodiment, the recipient device is an IM client such as the IM clients 305 and 310. In one embodiment, the originating device that initiates the telephone call is a PSTN device such as the PSTN clients 335 and 340. In another embodiment, the originating device that initiates the telephone call is a VoIP device such as the VoIP clients 345 and 350. In one embodiment, an originating user is associated with the originating device.

In Block 520, a session initiation protocol (SIP) request is sent. In one embodiment, the SIP request is received by the softswitch 325. In one embodiment, the SIP request originates from the one of the VoIP devices 345 and 350 or from the PSTN gateway 330. In one embodiment, the SIP request is forwarded to the IM gateway 320. In one embodiment, softswitch 325 selects a particular IM gateway depending on the telephone number associated with the SIP request.

In Block 530, the telephone number associated with the SIP request is matched with a particular IM identifier. In one embodiment, each IM identifier is associated with a recipient user. It is possible to have multiple IM identifiers associated with the same recipient user. In one embodiment, the SIP request is matched with the particular IM identifier in the IM gateway 320. In another embodiment, the SIP request is matched with the particular IM identifier in the softswitch 325.

In Block 540, the status of the particular IM identifier associated with the SIP request is detected. In one embodiment, the status is detected within the IM gateway 320. In another embodiment, the status is detected within the IM server 315. In one embodiment, the status of the IM identifier may be one of "available", "busy", "away from my desk", and the like.

In Block 540, if the particular IM identifier associated with the SIP request is not available, then the status of call forwarding for the particular IM identifier is detected in Block 580.

In Block 540, if the particular IM identifier associated with the SIP request is available, then the SIP request is transformed into an IM message in the IM gateway 320 and routed to the IM client that is associated with the particular IM identifier in Block 550.

In one embodiment, the particular IM identifier corresponds with a particular IM client based on the recipient user associated with the particular IM identifier being logged onto the particular IM client. For example, when the recipient user associated with the IM identifier is logged onto the IM client 305, then the IM message based on the SIP request associated with the IM identifier is sent to the IM client 305. Similarly, when the recipient user associated with the IM identifier is logged onto the IM client 310, then the IM message based on the SIP request associated with the IM identifier is sent to the IM client 310.

In one embodiment, sending the SIP request to the particular IM client is manifested by the particular IM client notifying the recipient user through an audible signal, a visual signal, and/or a tactile signal.

In Block 540, if the particular IM identifier associated with the SIP request is not available, then a call forwarding option is detected in Block 580.

If the particular IM identifier has a call forwarding number pre-selected, then the new forwarding number is recognized in Block 585 and the new forwarding number is transmitted to the Block 510 to be processed.

If the particular IM identifier has no call forwarding preference, then a message may be recorded for the recipient user by the originating user in Block 590.

In Block 555, the recipient device may reply to the SIP request by accepting the telephone call or denying the telephone call. In one embodiment, the recipient user accepts the telephone call by supplying an input that indicates that the telephone call is accepted. The input may include picking up the handset, operating a button, and the like. In one embodiment, the recipient rejects the telephone call by not responding to the SIP request.

If the telephone call is accepted by the recipient user, the IM client sends an acceptance message back to the originating device that dialed the telephone number in the Block 560. Recall that the originating device dialed the telephone number in the Block 510.

If the telephone call is rejected by the recipient user, the user of the originating device is given the opportunity to leave a message for the recipient user in the Block 590.

In Block 570, the telephone call is established between the recipient user and the originating user through the recipient device and the originating device, respectively.

The flow diagram in FIG. 6 illustrates determining the correct IM identifier associated with a shared telephone number according to one embodiment of the invention.

In Block 610, a shared telephone number is dialed from an originating telephone number associated with the originating device. In one embodiment, the shared telephone number is utilized by multiple IM identifiers. In one embodiment, each identifier belongs to a unique participant.

In Block 620, the originating telephone number is detected. If the originating telephone number is detected, then the area code of the originating telephone number is detected in Block 640. In one embodiment, a caller identification feature may be utilized to detect the originating telephone number from the originating device.

If the originating telephone number cannot be detected, then the area code of the originating telephone number is requested in Block 630.

In Block 650, the detected or stated area code from the originating telephone number is matched with a state in which the area code resides. For example, if the detected or stated area code is "408", the corresponding state would be California since the area code 408 is located within California.

In Block 660, the IM identifier corresponding to the detected state from the Block 650 and the shared telephone number from the Block 610 is identified. In one embodiment, each shared telephone number may correspond with 50 different IM identifiers with each IM identifier corresponding to a different state with the United States.

By associating different geographic regions for each of the IM identifiers, multiple IM identifiers may utilize a shared telephone number without requiring the originating callers to remember an extension number. Further, each of the IM identifiers may utilize multiple geographic regions depending on need. The use of states to delineate geographic regions is merely one example. Any boundary schemes to identify geographic regions may be utilized including but not limited to counties, countries, and the like.

In Block 670, the telephone call is connected with the IM client associated with the particular IM identifier.

The foregoing descriptions of specific embodiments of the invention have been presented for purposes of illustration and description. The invention may be applied to a variety of other applications.

They are not intended to be exhaustive or to limit the invention to the precise embodiments disclosed, and naturally many modifications and variations are possible in light of the above teaching. The embodiments were chosen and described in order to explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method comprising:
    receiving a dialed telephone number from an originating device;
    receiving an originating telephone number associated with the originating device;
    matching at least a portion of the originating telephone number with a geographical region to determine the geographical region of the originating device;
    matching the dialed telephone number and the geographical region of the originating device to an instant messaging (IM) identifier;
    associating the IM identifier to a receiving device;
    sending an IM message to the receiving device to request acceptance of a telephone call;
    receiving an acceptance of the telephone call from the receiving device; and
    establishing a telephone call between the originating device and the receiving device.

2. The method according to claim 1 wherein the receiving device is an IM client.

3. The method according to claim 1 wherein the originating device is a Public Switched Telephone Network (PSTN) client.

4. The method according to claim 1 wherein the originating device is a Voice over Internet Protocol (VoIP) client.

5. The method according to claim 1 further comprising transforming a session initiation protocol (SIP) request into an IM message to request acceptance by the receiving device.

6. The method according to claim 1 further comprising detecting a status of the IM identifier.

7. The method according to claim 6 further comprising forwarding the telephone call to a new number based on the status of the IM identifier.

8. The method according to claim 6 further comprising recording a message from the originating device based on the status of the IM identifier.

9. The method according to claim 1 further comprising dialing the dialed telephone number from the originating device.

10. The method of claim 1 wherein the receiver device is associated with multiple IM identifiers.

11. A system, comprising:
    an originating device associated with an originating, telephone number, the originating device configured to dial a telephone number to complete a telephone call;
    a softswitch coupled to the originating device configured to receive the dialed telephone number and to route a session initiation protocol (SIP) request based on the dialed telephone number;
    an instant messaging (IM) gateway coupled to the softswitch configured to convert the SIP request into an IM protocol request to a receiving device, the receiving device selected, at least in part, based upon a geographical region of the originating device determined from the originating telephone number; and
    the receiving device coupled to the IM gateway to receive the IM protocol request to complete the telephone call between from the originating device to the receiving device.

12. The system according to claim 11 further comprising an IM server coupled between the receiving device and the IM gateway configured to relay the IM protocol request to the receiving device.

13. The system according to claim 11 wherein the receiving device is an IM client.

14. The system according to claim 11 wherein the receiving device is associated with an IM identifier.

15. The system according to claim 14 wherein the IM identifier is associated with the dialed telephone number.

16. The system according to claim 11 further comprising a Public Switched Telephone Network (PSTN) gateway coupled between the softswitch and the originating device.

17. A method comprising:
    receiving a shared telephone number from an originating device;

receiving an indication of a geographical region associated with the originating device, the indication of the geographical region determined at least in part from an originating telephone number associated with the originating device;

matching the shared telephone number and the indication of a geographical region associated with the originating device to an instant messaging (IM) identifier;

associating the IM identifier to a receiving device; and establishing a telephone call between the originating device and the receiving device.

18. The method according to claim 17 further comprising detecting an area code of the originating telephone number associated with the originating device as the indication of a geographical region.

19. The method according to claim 17 wherein the indication of a geographical region is an area code of the originating telephone number associated with the originating device.

20. The method according to claim 17 further comprising requesting an area code from the originating device of the originating telephone number as the indication of a geographical region.

21. An apparatus comprising:

means for receiving a dialed telephone number from an originating device;

means for receiving an originating telephone number of the originating device;

means for matching at least a portion of the originating telephone number with a geographical region to determine the geographical region of the originating device;

means for matching the dialed telephone number and the geographical region of the originating device to an instant messaging (IM) identifier;

means for associating the IM identifier to a receiving device;

means for sending an IM message to the receiving device to request acceptance of a telephone call; and means for establishing a telephone call between the originating device and the receiving device.

\* \* \* \* \*